(12) United States Patent
Mihelic et al.

(10) Patent No.: US 9,308,949 B1
(45) Date of Patent: Apr. 12, 2016

(54) SYSTEMS AND METHODS FOR REDUCING DRAG ON A VEHICLE OR VEHICLE COMBINATION

(71) Applicants: Richard R. Mihelic, Lewisville, TX (US); Bruce Bezner, Lindsay, TX (US); Jeffrey P. Smith, Prosper, TX (US)

(72) Inventors: Richard R. Mihelic, Lewisville, TX (US); Bruce Bezner, Lindsay, TX (US); Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/273,039

(22) Filed: May 8, 2014

Related U.S. Application Data

(60) Provisional application No. 61/821,160, filed on May 8, 2013.

(51) Int. Cl.
*B62D 35/00* (2006.01)

(52) U.S. Cl.
CPC .................... *B62D 35/001* (2013.01)

(58) Field of Classification Search
CPC .................................................... B62D 35/001
USPC ............................................. 296/180.4, 180.1
See application file for complete search history.

(56) References Cited

U.S. PATENT DOCUMENTS

| 2,038,265 | A | * | 4/1936 | Bradley | ................ | B60P 3/2205 |
| | | | | | | 105/1.1 |
| 3,722,918 | A | * | 3/1973 | Conner | .............. | B62D 53/0878 |
| | | | | | | 280/432 |

FOREIGN PATENT DOCUMENTS

| SE | DE 102005021517 A1 | * | 12/2005 | ........... | B62D 35/001 |
| WO | WO 2013055325 A1 | * | 4/2013 | ........... | B62D 35/001 |

* cited by examiner

*Primary Examiner* — Pinel Romain
(74) *Attorney, Agent, or Firm* — Christensen O'Connor Johnson Kindness PLLC

(57) ABSTRACT

A lead vehicle includes a chassis and front and rear wheel assemblies supportively coupled to the chassis. A trailer coupling interface is mounted to the chassis and is configured to couple to a tow vehicle. The lead vehicle further includes one or more seals cooperatively including first and second side leg sections positioned on the chassis laterally outwardly of the trailer coupling interface and a cross section positioned forwardly of the trailer coupling interface. The one or more seals are configured to form a barrier between the chassis and a portion of the tow vehicle.

16 Claims, 4 Drawing Sheets

SYSTEMS AND METHODS FOR REDUCING DRAG ON A VEHICLE OR VEHICLE COMBINATION

CROSS-REFERENCE TO RELATED APPLICATION

This application claims the benefit of U.S. Provisional Application No. 61/821,160, filed May 8, 2013, which is expressly incorporated herein by reference in its entirety.

BACKGROUND

Motor vehicles, and in particular trucks, are a critical component of the system for transporting materials, goods and people from place to place. The amount of energy required to move such vehicles depends on many factors. For instance, a substantial amount of energy is expended to overcome the resistance encountered in moving the vehicle through air. The amount of energy expended depends in large part on the aerodynamic drag force exerted on the vehicle by the air. A vehicle moving through air experiences a drag force, which may be divided into two components: frictional drag and pressure drag. Frictional drag comes from friction generated generally through the boundary layer as the vehicle passes through the air. Pressure drag results from the net pressure forces exerted as the air flows around the vehicle. A substantial component of the pressure drag is associated with the formation of a low pressure zone behind the vehicle, as evidenced by the formation of a wake behind the vehicle.

The distinction between frictional drag and pressure drag is useful because the two types of drag are due to different flow phenomena. Frictional drag is typically most important for attached flows that is, where the flow boundary layer has not separated from the vehicle surfaces, and is related to the surface area exposed to the flow. Pressure drag dominates for separated flows, and is generally related to the cross-sectional area of the vehicle facing the air flow. When the drag on the vehicle is dominated by pressure drag forces, it will expend far more energy traveling through air than the same vehicle dominated by friction drag forces. It is therefore advantageous in the design of a vehicle to reduce pressure drag forces, thereby increasing the aerodynamic properties and efficiency of the vehicle.

A bluff body, such as a conventional truck hood or front section, produces significant pressure drag at typical highway speeds. One reason for the large pressure drag is the presence of a sharp angle located at a leading edge of the truck hood. More specifically, typical truck front sections include a substantially vertical front surface or grille that meets, along an upper edge, a substantially horizontal top surface. The air flow passing over the front section, therefore, must negotiate an abrupt change in direction as the edge where the hood structure transitions from a substantially vertical orientation to a substantially horizontal orientation. This abrupt turn causes the flow to 'separate' from the top surface of the hood, forming a highly turbulent region of air located directly above the top surface of the hood, between the leading edge and the windshield.

A tractor-trailer combination is another vehicle that experiences excessive aerodynamic drag. Generally described, tractor-trailer combinations typically include a tractor having a so-called fifth wheel by which a box-like semi-trailer may be attached to the tractor by an articulated connection for transportation of the semi-trailer. By providing the articulated connection, a space or gap is formed between the rear wall of the tractor cab and the forward wall of the semi-trailer. It is well known that this gap, or the gap between succeeding trailers of a tractor trailer combination, causes wake regions and, as a result, pressure drag.

Pressure drag on tractor-trailer combinations is not limited to the frontal area of the tractor and/or the gap disposed between the tractor and the articulating trailer. It is well known that the rear end of bluff bodies, such as trailers, are known to contribute significantly to aerodynamic drag, as evidenced by the formation of a wake in the trailing region behind the trailer. The generation of the wake, formed by eddies, can be contributed to the shape of the conventional trailer, which is essentially a rectangular box having a flat, rectangular roof and matching floor, along with flat, rectangular side panels. The front and rear surfaces of such trailers are also generally flat rectangular surfaces. As such, current bluff bodies, such as trailers suitable for use with tractors of the Class 8 type, suffer from a low pressure zone at the rear of the trailer such that the airstream suffers from early separation, resulting in a broad eddying wake forming downstream of the separation. The net result is the creation of considerable aerodynamic drag.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One exemplary embodiment of a claimed lead vehicle includes a chassis and front and rear wheel assemblies supportively coupled to the chassis. A trailer coupling interface is mounted to the chassis and is configured to couple to a tow vehicle. The lead vehicle further includes one or more seals cooperatively including first and second side leg sections positioned on the chassis laterally outwardly of the trailer coupling interface and a cross section positioned forwardly of the trailer coupling interface. The one or more seals are configured to form a barrier between the chassis and a portion of the tow vehicle.

An exemplary embodiment of a claimed vehicle trailer includes a trailer body having a bottom wall and rear wheel assemblies disposed in a supporting relationship with respect to the trailer body. Left and right side fairings are associated with the trailer body and positioned underneath the bottom wall of the trailer body and rearwardly of the rear wheel assemblies. Each of the side fairings includes an outwardly facing deflector surface that extends upwardly as it extends rearwardly.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
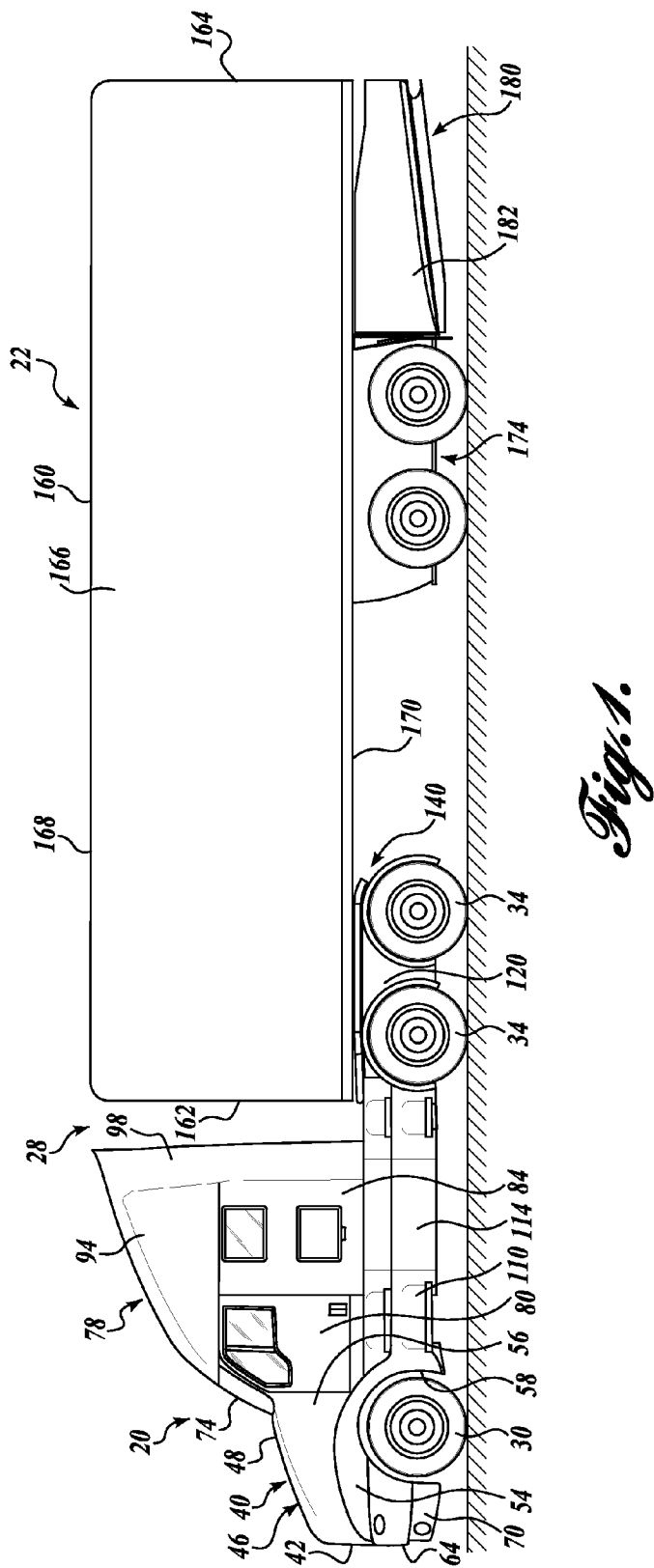
FIG. 1 is a side plan view of a vehicle combination, such as an "over the road" tractor-trailer combination, formed in accordance with aspects of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of systems and methods for improving the aerodynamic efficiency (e.g., reduce drag) on vehicles. Several embodiments of the present disclosure are directed to systems and methods that utilize one or more fairings, deflectors, fins, seals, plates, etc., on one or more sections of a vehicle, such as a semi-truck, sometimes referred to as a tractor, a semi-trailer, a tractor-trailer combination, etc., for reducing the aerodynamic drag thereon. As will be described in more detail below, one example of a drag reducing device includes a seal located in proximity of the "fifth wheel" interface between the tractor and trailer. As will be further described in more detail below, another example of a drag reducing device is located underneath the trailer along the aft region thereof.

Non-limiting examples of vehicles that may benefit from the aerodynamic devices and methods of the present disclosure include but are not limited to light, medium, and heavy duty trucks, recreational and vocational vehicles, buses, etc., just to name a few. Although embodiments of the present disclosure will be described with reference to a Class 8 truck, trailer, and/or combination, and while the system of aerodynamic devices, separate components thereof, may find their primary use on medium and heavy duty trucks and associated trailers, one skilled in the relevant art will appreciate that the disclosed embodiments are illustrative in nature and, therefore, should not be construed as limited to applications with Class 8 trucks. It should therefore be apparent that one or more of the aerodynamic components and drag reducing methods of the present disclosure can have wide application, and may be used in any situation where reducing the drag of any type of a vehicle is desirable.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

FIG. 1 illustrates a lead vehicle 20 in the form of a heavy duty tractor and a trailing vehicle 22 in the form of a semi-trailer or trailer. The tractor 20 is articulatedly connected to a trailer 22 by a trailer coupling interface 26 (hidden in FIG. 1 but shown in FIG. 2), such as, for example, a so called fifth wheel, to form a tractor-trailer combination. The connection between the tractor 20 and the trailer 22 forms a space or gap 28. The systems or any combination of components of the systems hereinafter described may be installed on new vehicles, such as the tractor 20, the trailer 22, or the combination, or may be retrofitted on existing vehicles, such as the tractor 20, the trailer 22, or the combination.

Figure 2:
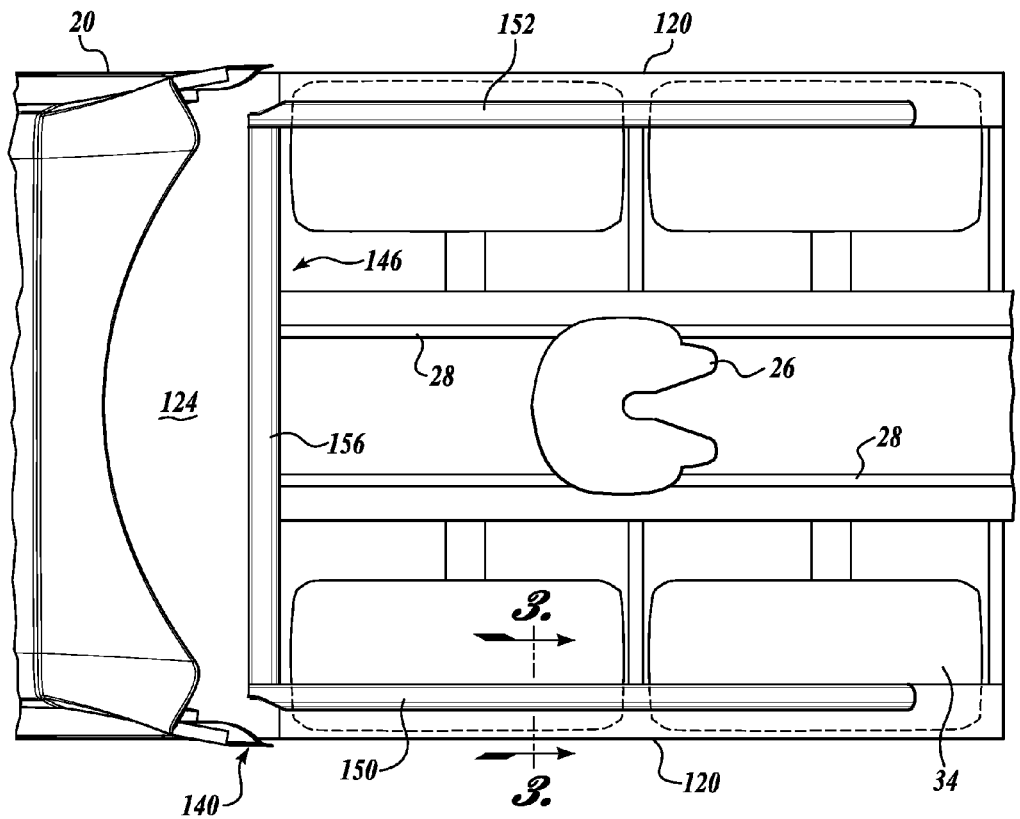
FIG. 2 is a partial top plan view of the rear section of the tractor of FIG. 1 when the trailer is decoupled.

As shown in FIGS. 1 and 2, the tractor 20 comprises a chassis 28 (see FIG. 2) is supported by wheels 30 of a front wheel assembly and wheels 34 of a rear wheel assembly. The wheels 30 and 34 are connected to the chassis via conventional axles and suspension assemblies (not shown). In the embodiment shown in FIGS. 1 and 2, the rear wheel assembly is of the dual-axle type.

A front section 40 of the vehicle 20 is supportably mounted on the chassis, as shown in FIG. 1. The front section 40 generally includes a vertically oriented front surface or grille 42, an optional grille crown (not shown) that surrounds the vertical grille 42, and a hood 46 that generally covers a block-like shaped engine compartment housing an internal combustion engine that propels the tractor. The hood 46 includes a gently upwardly sloping top skin 48 and downwardly depending side skins 50. In the embodiment shown, the side skins 50 are integrally formed with fenders 54, which define wheel wells 58 that house the wheels 30. The fenders 54 in this example may include integrally formed headlamp assemblies and side turn indicators (not shown).

The front section 40 further includes a bumper 64 positioned below the somewhat vertical grille 42. The bumper 64 "wraps around" the front of the tractor 20 from the wheel well 58 of the left fender 54 to the wheel well 58 of the right fender 54, horizontally across the front of the vehicle 20. Below the bumper 64, an air dam 70 may be provided. The air dam extends downwardly to just proximal the ground surface in order to block the flow of air underneath the tractor 20, thus reducing drag.

The top skin 48 of the hood 40 extends rearwardly from an upper leading edge of the grille crown 44 to the windshield 74 of a cab section 78, which is supportably mounted on the chassis rearwardly of the front section 40. The cab section 78 generally includes vertically oriented driver and passenger doors 80, a roof (hidden in FIG. 1), and an optional sleeper section 84 that, together with the windshield 74, form a compartment that houses driver and passenger seats, a dashboard with various gages, telematics, system controls, etc., and steering wheel for operating the tractor 20, and sleeping quarters if the optional sleeper section is included.

In the embodiment shown, the cab section 78 includes various aerodynamic devices, such as fairings, to improve the aerodynamics of the tractor. Examples of such fairings may include a roof fairing 94, which provide a smooth transition from the windshield 74 to the rear end of the cab section 78 as defined by a generally vertically oriented rear wall (hidden in FIGS. 1 and 2). In the embodiment shown, the roof fairing 94 generally extends upwardly as the roof fairings extend rearwardly. The tractor 20 may also include extender fairings 98 disposed at the trailing edges of the cab section 78. The extender fairings 98 extend rearwardly into the gap 28, as best shown in FIG. 1, and aim to reduce or severely limit the amount of air flow into the gap from cross winds, head winds, etc.

The tractor 20 may optionally include one or more chassis fairings that aid in covering one or more structural aspects of the tractor, such as the gas tank, storage boxes, etc. The fairings provide improved air flow, and aid in inhibiting air flow underneath the chassis. As a result, drag on the tractor 20 is reduced. In the embodiment shown in FIG. 1, the one or more chassis fairings may include a front chassis fairing 110. The front chassis fairing 110 in some embodiments includes integrated steps for cab ingress/egress. Additional fairings, such as rear or quarter fender fairings, may be provided or integrally formed with the front chassis fairing 110. The one or more chassis fairings may also include a mid chassis fairing(s) 114. The mid chassis fairing(s) in some embodiments is hingedly coupled to the chassis for providing access to the gas tanks, compressed air tanks, storage boxes, hoses, etc. The one or more chassis fairings may optionally include a rear chassis fairing 120. The rear chassis fairing forms fender-like structure that covers the wheels 34 of the rear wheel assemblies and can extends from the mid chassis fairing 114 to the end of or aft of the chassis. As will be described in more detail below, the rear chassis fairings 120 includes a top surface for supporting a sealing device.

As briefly discussed above, the interface between the tractor 20 and the trailer 22 creates a gap that left unattended causes large amounts of drag on the combination. As will now be explained in more detail, embodiments of the present disclosure include one or more aerodynamic devices to address this gap problem. For example, a deck plate 124 can be mounted to the chassis rearwardly of the rear wall of the cab section 78, as shown in FIG. 2. The deck plate 124 aims to reduce or severely limit the amount of air that flows into the gap to flow underneath the rear wheel assembly and underneath the trailer 22. In some embodiments, the deck plate 124 in conjunction with the rear chassis fairings 120 and/or other support structure supports a sealing device 140. The sealing device 140 in some embodiments extends generally around an opening 146, which provides access to, for example, the trailer coupling interface 26, rear wheel assemblies, etc. The sealing device 140 is configured and arranged to provide a seal between the deck plate 124 and the rear chassis fairings 120 and/or other support structure and the bottom surface of the trailer 22 when coupled to the tractor 20.

Figure 3:
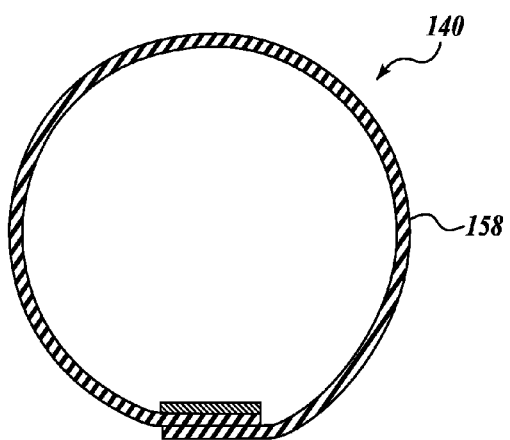
FIG. 3 is a cross-sectional of a sealing device taken along lines 3-3 of FIG. 2.

In some embodiments, the sealing device 140 is in the form of a bulb seal and is disposed in a U-shaped pattern, with the sides of the seal extending between the bottom of the trailer and the top surface of the chassis fairing(s). In that regard, the sealing device 140 includes side sections 150 and 152 and a front section 156. In some embodiments, the one or more sealing devices 140 includes a material selected rubber, a thermoplastic elastomer, synthetic rubber, etc., and can be formed in one embodiment by rolling a sheet 158 of such material into a shaped having a generally circular cross-section, the ends of which being hermetically sealed, as shown in FIG. 3. In other embodiments, the sealing can be formed as a fluid (e.g., gas, liquid, etc.) filled bladder, foam core bladder, etc. In these and other embodiments, the bulb seal has a height greater than about three inches, and is in the range of about five inches and about six inches in some embodiments.

Figure 4A:
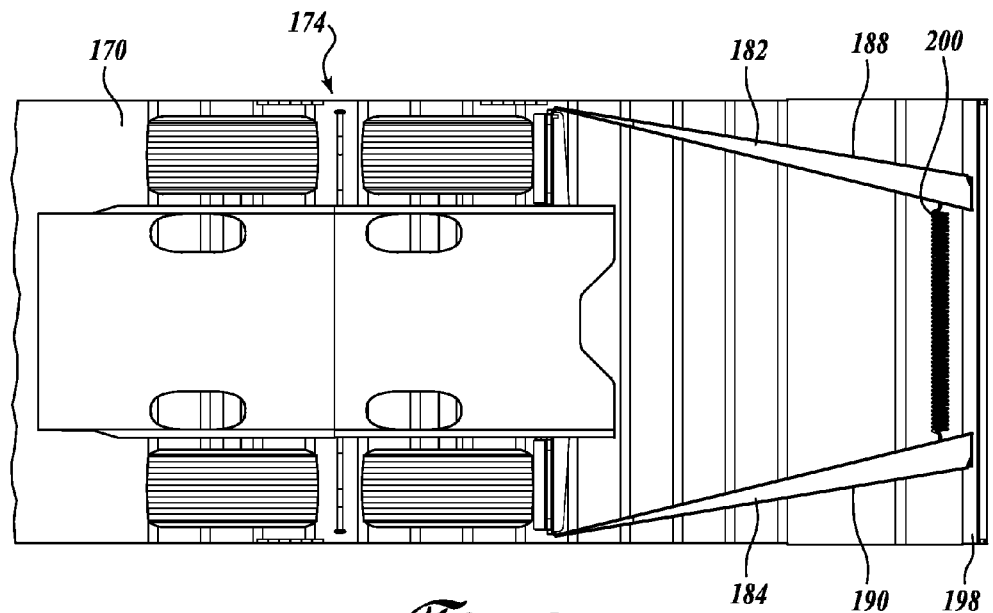
FIG. 4A is a partial bottom plan view of the trailer of FIG. 1 depicting one example of an underbody "boat tail" fairing system formed in accordance with aspects of the present disclosure.
Figure 4B:
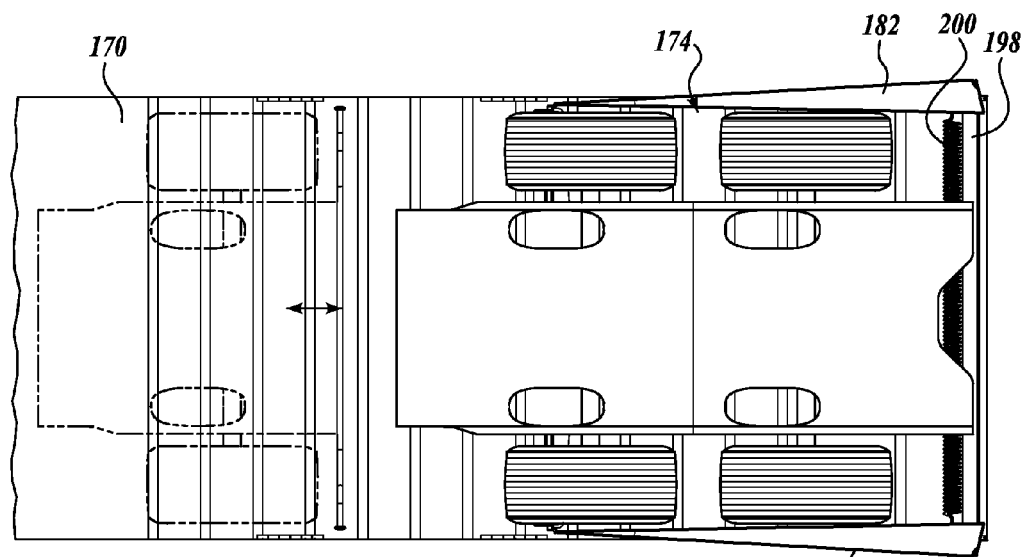
FIG. 4B is a partial bottom plan view of the trailer of FIG. 1 depicting the underbody "boat tail" fairing system in a second, longitudinal position.

As shown in FIGS. 1 and 4A-4B, the trailer 22 includes a trailer body 160 that defines a cargo carrying interior cavity (not shown). In the embodiment shown, the trailer body 160 is generally rectangular in shape, having a generally planar, vertically oriented front and rear end panels 162 and 164, generally planar, vertically oriented side panels 166, a generally planar top panel 168, and a generally planar bottom panel, sometimes referred to as a cargo-supporting floor deck 170.

The undercarriage of the trailer 22 is comprised of groupings of various drag-producing components, which generally reside below a cargo-supporting floor deck 170. The drag-producing components of a semi-type cargo trailer undercarriage customarily include rear axles and wheels of the rear wheel assembly 174, and other components, such as brake components, suspension components, and longitudinal and transverse structural support members not shown for ease of illustration but well known in the art.

Figure 5A:
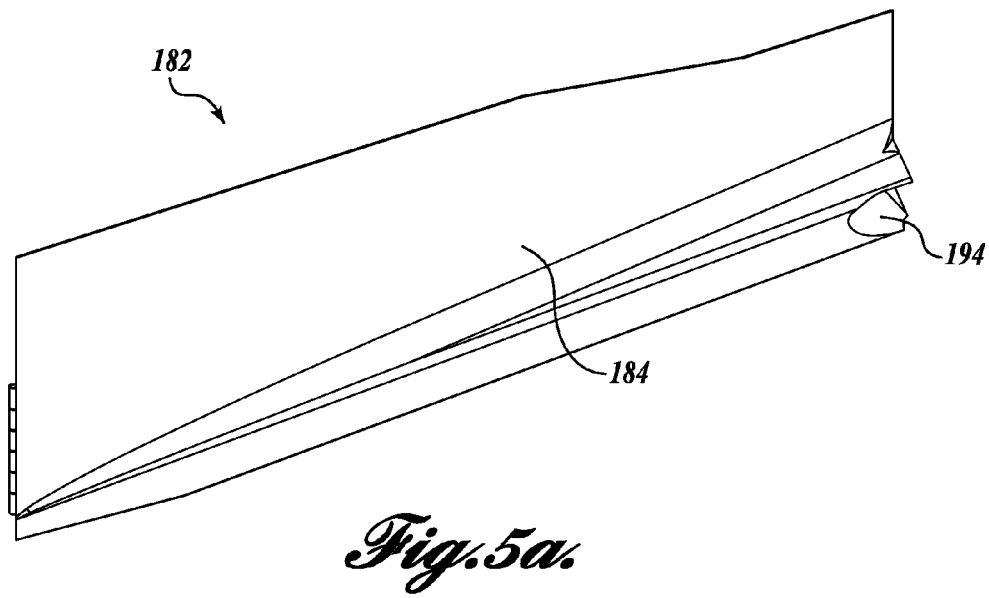
FIGS. 5A and 5B are front and rear isometric views of one underbody "boat tail" fairing of FIG. 4A.
Figure 5B:
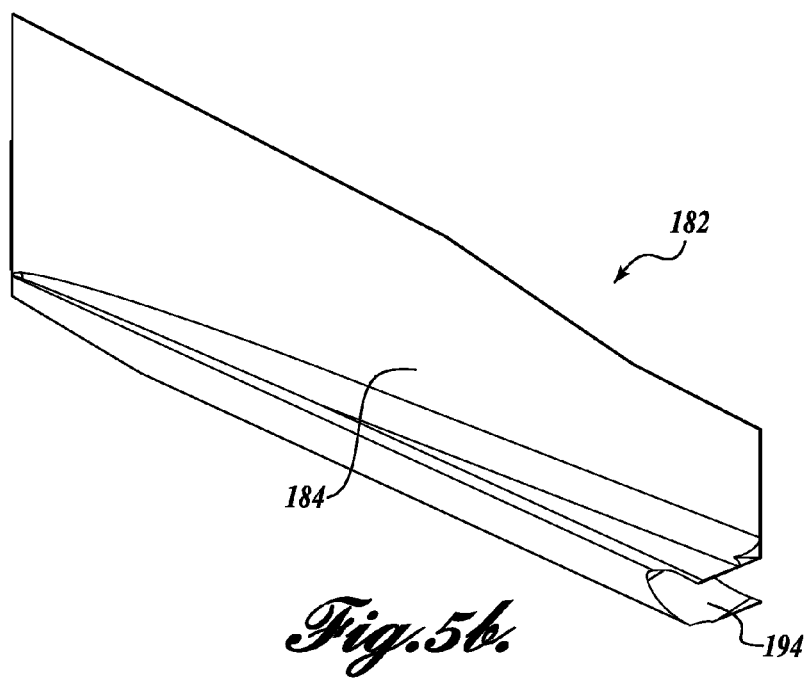

In accordance with another aspect of the present disclosure, a fairing system provided aft of the trailer wheels can be employed to reduce the drag on the trailer and/or tractor-trailer combination. In that regard, attention is directed to FIGS. 1 and 4A-4B, which illustrates an underbody "boat tail" fairing system, generally designated 180. The fairing system 180 includes left and right fairings 182 and 184, which may include panels, plates, deflectors, etc, that form outwardly facing air deflecting or directing surfaces 188 and 190, respectively. As shown in FIG. 4A-4B, the left and right underbody fairings 182 and 184 extend rearwardly from just aft of the rear wheel assembly to the rear panel 164 of the trailer 22. As the underbody fairings extend rearwardly, the surfaces 188 and 190 slant generally inwardly and optionally upwardly, as shown in FIGS. 1, 5A-5B.

In some embodiments, a notch 194 or other interface can be provided at the rear edge of the underbody fairings 182 and 184 to accommodate, for example, a rear trailer bumper 198, as shown in FIG. 4A. In these and other embodiments, the left and right fairings 182 and 184 can be used in combination with a trailer boat tail or similar device to reduce drag caused in part by the wake region aft of the trailer body.

In some embodiments, the underbody fairings 182 and 184 are hingedly mounted to the trailer 22 at their front ends about a generally vertical axis. The fairings 182 and 184 are pivotally movable from the first or slanted position shown in FIG. 5A, which aids in the reduction of drag as the trailer is moving forwardly, to the generally longitudinal position also shown in FIG. 5B. This second or longitudinal position allows the underbody fairings 182 and 184 to avoid interfering with the rear wheel assembly 174 or bogie on trailer models that employ sliding bogies, sometimes referred to as slide wheels. One example of a sliding bogie is described in U.S. Pat. No. 8,573,680, the disclosure of which is hereby incorporated by reference.

In the embodiment shown, the fairings 182 and 184 are passively moved from the first, slanted position and the second, longitudinal position, via rearward movement of the sliding rear wheel assembly 174. The fairings may be biased in the first, slanted positions, via spring assemblies (e.g., torsions springs, etc.) associated with each left and right fairing. Alternatively or additionally, the left and right fairings may be coupled via a tension spring 200 or the like. Other configuration for moving the fairings between the first and second positions may be employed. For example, the left and right fairings can be moved between the first and second positions via actuators, such as manually or motor operated lead screws, hydraulic/pneumatic cylinders, etc., and associating controls.

It should be noted that for purposes of this disclosure, terminology such as "upper," "lower," "vertical," "horizontal," "fore," "aft," "inner," "outer," "inwardly," "outwardly," "proximal", "distal," "front," "rear," etc., should be construed as descriptive and not limiting the scope of the claimed subject matter. Further, the use of "including," "comprising," or "having," and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A lead vehicle, comprising:
   a chassis;
   front and rear wheel assemblies supportively coupled to the chassis;
   a trailer coupling interface mounted to the chassis, the trailer coupling interface configured to couple to a tow vehicle;
   one or more seals cooperatively including first and second side leg sections positioned on the chassis laterally outwardly of the trailer coupling interface and a cross section positioned forwardly of the trailer coupling interface, wherein the one or more seals are configured to form a barrier between the chassis and a portion of the tow vehicle.

2. The lead vehicle of claim 1, wherein the first or second side leg section extends forwardly of the cross section.

3. The lead vehicle of claim 1, wherein the one or more seals includes a material selected from the group consisting of rubber, a thermoplastic elastomer, and synthetic rubber.

4. The lead vehicle of claim 1, wherein the one or more seals includes a bulb seal.

5. The lead vehicle of claim 4, wherein the bulb seal has a height greater than about three inches.

6. The lead vehicle of claim 5, wherein the bulb seal has a height of in the range of about five inches and about six inches.

7. The lead vehicle of claim 4, wherein the bulb seal includes an fluid bladder.

8. The lead vehicle of claim 4, wherein the bulb seal includes a sheet of natural or synthetic rubber rolled into a shaped having a generally circular cross-section, the ends of which being hermetically sealed.

9. The lead vehicle of claim 1, further including
   a deck plate mounted on the chassis and disposed generally horizontally thereacross;
   left and right surfaces supported by the chassis and positioned adjacent the rear wheel assemblies, wherein the first and second side leg sections are mounted to the left and right surfaces, respectively, and the cross section is mounted to the deck plate.

10. The lead vehicle of claim 9, wherein the deck plate and the left and right leg sections are contiguously connected.

11. A vehicle trailer, comprising:
    a trailer body having a bottom wall;
    rear wheel assemblies disposed in a supporting relationship with respect to the trailer body; and
    left and right side fairings associated with the trailer body and positioned underneath the bottom wall of the trailer body and rearwardly of the rear wheel assemblies, wherein each of the side fairings includes an outwardly facing deflector surface that extends upwardly as it extends rearwardly.

12. The vehicle trailer of claim 11, wherein the deflector surfaces extend inwardly and they extend rearwardly.

13. The vehicle trailer of claim 11, wherein the first and second fairings are positioned on the left and right sides of the trailer body, the first and second fairings being pivotally mounted about spaced vertical axes.

14. The vehicle trailer of claim 11, wherein the first and second fairings are pivotally movable between a slanted position in which the deflector surfaces extend inwardly and they extend rearwardly and a generally longitudinal position in which the deflector surfaces extend along the vehicle body.

15. The vehicle trailer of claim 14, wherein the wheel assemblies are slidable, and wherein the generally longitudinal position allows the wheel assemblies to move rearwardly without interference with the first and second fairings.

16. The vehicle trailer of claim 15, further including a rear bumper mounted a spaced distance below the bottom wall, wherein the ends of the first and second fairings interface with the rear bumper.

* * * * *